United States Patent [19]
Walley

[11] Patent Number: 5,052,026
[45] Date of Patent: Sep. 24, 1991

[54] BIT SYNCHRONIZER FOR SHORT DURATION BURST COMMUNICATIONS

[75] Inventor: George M. Walley, Indianlantic, Fla.

[73] Assignee: Harris Corporation, Melbourne, Fla.

[21] Appl. No.: 307,046

[22] Filed: Feb. 7, 1989

[51] Int. Cl.[5] .............................................. H03D 3/24
[52] U.S. Cl. ................................... 375/119; 375/116; 328/63
[58] Field of Search ............... 375/106, 110, 111, 116, 375/108, 118, 119, 120, 101; 328/181, 184, 185, 63; 307/527, 100.1, 105.3

[56] References Cited

U.S. PATENT DOCUMENTS

| | | | |
|---|---|---|---|
| 3,878,334 | 4/1975 | Halpern | 375/118 |
| 3,898,574 | 8/1975 | Allen et al. | 375/120 |
| 4,112,383 | 9/1978 | Burgert | 375/111 |
| 4,189,622 | 2/1980 | Foshee | 375/111 |
| 4,196,416 | 4/1980 | Stein | 375/111 |
| 4,210,776 | 7/1980 | Van Meter | 375/120 |
| 4,280,224 | 7/1981 | Chethik | 375/116 |
| 4,375,693 | 3/1983 | Kuhn | 375/120 |
| 4,375,694 | 3/1983 | Kuhn | 375/120 |
| 4,376,309 | 3/1983 | Fenderson et al. | 375/101 |
| 4,525,685 | 6/1985 | Hessleberth et al. | 375/111 |
| 4,539,693 | 9/1985 | Boudault | 375/110 |
| 4,653,074 | 3/1987 | Griffin et al. | 375/110 |
| 4,682,343 | 7/1987 | Pfiffner | 375/120 |
| 4,881,243 | 11/1989 | Whitt | 375/120 |

OTHER PUBLICATIONS

L. Lee et al, "Fast Synchronization with Burst-Mode Digital Signal", JPL; CIT Pasadena, Calif., Jul. 1980.

Primary Examiner—Stephen Chin
Attorney, Agent, or Firm—Evenson, Wands, Edwards, Lenahan & McKeown

[57] ABSTRACT

In order to rapidly acquire and track a clock signal embedded in a reduced length synchronization preamble, a bit synchronizer contains a digital counter, which counts clock signals from a local clock generator having a frequency that is a multiple of the frequency of the data modulations in the received signal. The inverse of the most significant bit output of the counter sources the regenerated clock signal. In response to transitions in the monitored signal, the contents of the counter are coupled to an accumulator to provide successive measures of the (phase) difference between the times of occurrence of the regenerated clock signal and the actual times of occurrence of the sync preamble transitions. The contents of the accumulator are averaged over a prescribed number of monitored transitions and the resulting average is coupled to comparator, which compares the phase difference average output of the accumulator with the contents of the counter. When the phase difference average coincides with the contents of the counter, the counter is reset, thereby aligning the phase of the regenerated clock with that of the monitored signal. In addition, as the accumulator is updated, its input values from the counter are made available over a separate dedicated output link, to permit an attendant communications control processor to monitor the tracking performance of the apparatus.

29 Claims, 2 Drawing Sheets

BIT SYNCHRONIZER FOR SHORT DURATION BURST COMMUNICATIONS

FIELD OF THE INVENTION

The present invention relates in general to burst communication systems and is particularly directed to an apparatus for generating a data recovery clock signal in synchronism with signal transitions in the received data.

FIELD OF THE INVENTION:

The successful recovery of information contained within received digital communication signals requires the use of a data recovery clock signal the frequency and phase of which are synchronized with transitions in the incoming digital data stream. In continuous mode systems, where the clock can be monitored all the time, bit timing is simple and straightforward. In burst mode systems, on the other hand, in which the receiver site has no a priori knowledge of the phase of the data clock, rapid tuning of the receiver to accurately align a data recovery clock is an essential requirement for successful operation. Conventional timing mechanisms include the use of a high precision (and expensive) oscillator on which the timing of the data modulations are based and a burst synchronization preamble the analysis of which is used to slew a local clock generator prior to recovery of subsequent user data. Typically, the sync preamble is of a reasonable length (e.g. hundreds of bit times) to provide an adequate window for accomplishing bit synchronization prior to receipt of the actual data. In either case, the mechanism is usually hardware intensive, and thus not readily incorporated in a receiver environment where size and complexity are limited.

SUMMARY OF THE INVENTION

In accordance with the present invention, the signal format and hardware complexities of conventional burst mode timing recovery mechanisms are obviated by a bit synchronization apparatus that is able to operate on a reduced length synchronization preamble (on the order of forty bit times or less) using simplified digital logic components (e.g. programmable array logic) and rapidly acquire and track the frequency and phase of the embedded data clock signal. For this purpose the apparatus according to the present invention includes a digital counter, which is coupled to receive clock signals from he frequency of the data modulations in the received signal. The inverse of the most significant bit output of the counter sources the regenerated clock signal. In response to transitions in the monitored signal (sync preamble), the contents of the counter are coupled to an accumulator to provide successive measures of the (phase) difference between the times of occurrence of the regenerated clock signal and the actual times of occurrence of the sync preamble transitions. The contents of the accumulator are averaged over a prescribed number of monitored transitions and the resulting average is coupled to comparator, which compares the phase difference average output of the accumulator with the contents of the counter. When the phase difference average coincides with the contents of the counter, the counter is reset, thereby aligning the phase of the regenerated clock with that of the monitored signal. Should the counter count to capacity and roll over without a transition in the monitored signal having been detected, associated control logic causes a prescribed pseudo synchronized clock code to be coupled to the accumulator so as to compensate for a missed sync preamble transition (e.g. not received due to noisy channel). In addition, as the accumulator is updated, its input values from the counter are made available over a separate dedicated output link, to permit an attendant communications control processor to monitor the tracking performance of the apparatus.

DETAILED DESCRIPTION

Figure 1:
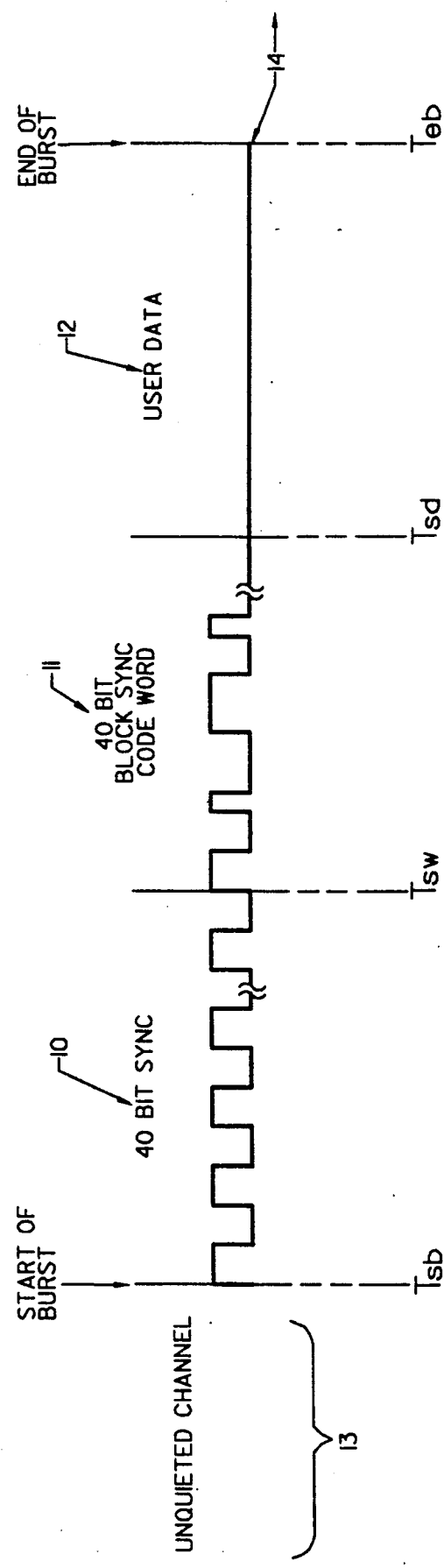
FIG. 1 shows the format of an exemplary digital signal sequence that is frequency modulated on a carrier burst, and contains a timing recovery preamble having prescribed number of alternate binary states.

Before describing in detail the particular improved burst mode communications bit synchronizer in accordance with the present invention, it should be observed that the present invention resides primarily in a novel structural combination of conventional communication and circuits and digital logic components and not in the particular detailed configurations thereof. Accordingly, the structure, control and arrangement of these conventional circuits and components have been illustrated in the drawings by a readily understandable block diagram which shows only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Attention is initially directed to FIG. 1, which shows the format of an exemplary digital signal sequence that is frequency modulated on a carrier burst, and contains a timing recovery preamble 10 comprised of a prescribed number (e.g. forty bit times) of alternate binary states (ones and zeros), followed by a (forty bit) sync word (e.g. a prescribed block code reference sequence 11 and a succeeding field 12 of actual encoded data. Since the mode of transmission from station to station involves a burst mode FM carrier, immediately prior to the start of the burst at time Tsb, the channel is effectively unquieted or noisy, as shown by pretransmission interval 13. Once the receiver 'turns on' and begins to demodulate the incoming carrier, it outputs a sequence comprised of alternating ones and zeros within the timing recovery preamble 10. The (forty bit) length of the pattern is sufficiently long to allow for a minor loss of bits at the start of the burst without failing to acquire and lock on to the data clock. In practice it has been found that the clock recovery apparatus of the present invention begins tracking usually within a much lower bit time interval (typically on the order of twenty bit times). Consequently, the interval chosen provides an adequate margin of assurance that once the block code sync word field 11 is encountered at time Tsw, the receiver clock will already be tracking the incoming signal, so that decoding of the data field, which begins at time Tsd, can proceed. At the termination of the data field at the end of the burst (time Teb), the channel again returns to its previous unquieted state, as shown at interval 14.

Figure 2:
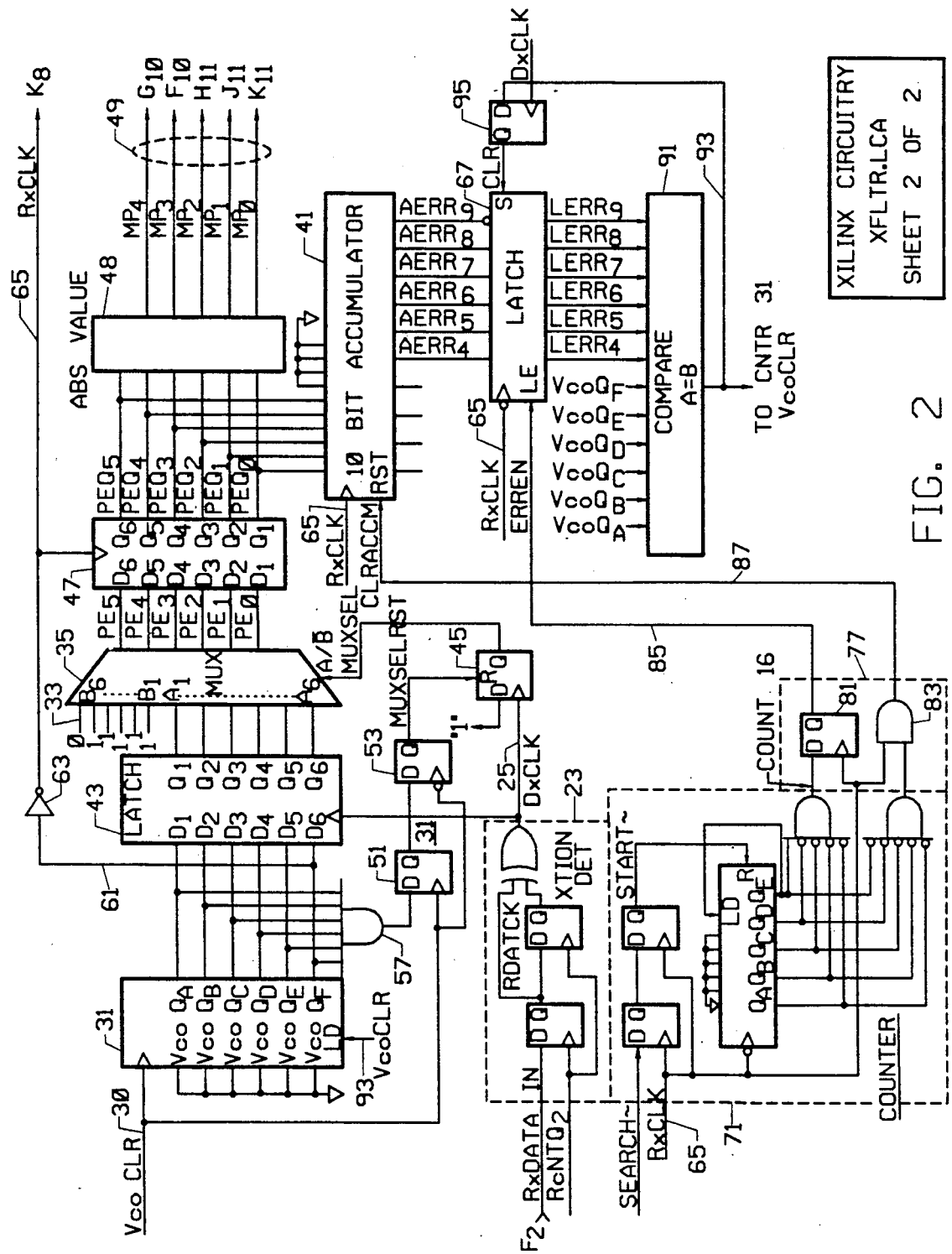
FIG. 2 diagrammatically illustrates a digital bit synchronizer in accordance with the present invention, which operates on the timing recovery preamble of FIG. 1.

As pointed out previously, the timing recovery mechanism of the present invention operates on the considerably reduced length synchronization preamble 10 using a simplified digital logic circuit, diagrammatically illustrated in FIG. 2, and is able to rapidly acquire and track the frequency and phase of the data clock signal embedded within the preamble. Referring now to FIG. 2, the demodulated output from an associated upstream FM receiver, which is effectively represented by the format of the signal sequence illustrated in FIG. 1, is coupled over an input link 21 to a transition detector 23, the output of which is a data transition clock signal (DXCLK) on line 25. It should be noted the transition detector 23 produces an output pulse for any occurrence of a change in state of the output of the receiver. Consequently, during its pre-burst unquieted state, where the input to the receiver is effectively noise, transitions may be detected. However, such a non-periodic input does not present a problem to the invention, since the timing recovery apparatus attempts to regenerate and align a clock on the basis of whatever input it receives. Once an actual transmission burst begins, the invention conforms with the new signal.

Data transition output line 25 is coupled to a set of control flip-flops for controlling the forwarding of timing codes from a counter 31 or a hardwired code value input 33 to a multiplexer 35 to a downstream accumulator 41. Specifically, line 25 is coupled to the clock input of a timing code latch 43 and to the clock input of a flip-flop 45, the 'D' input of which is hardwired high. The Q output of flip-flop 45 is coupled to the select input of multiplexer 35 to control which of the hardwired code value and latch inputs will be passed through to a downstream retiming buffer 47 and therefrom to accumulator 41. The contents of buffer 47 are also coupled to an output buffer 48, to provide an interface through which the phase difference values may be externally accessed and thereby monitored by an attendant communications control processor (not shown), so that a measure of performance of the system may be obtained. In a communications network having a number of participants in which respective receiver devices containing the present invention are employed, such a mobile unit (e.g. railroad) communications network, the choice of which of plural channels has the best signal quality and therefore is to be used by a central control station for transmission purposes is facilitated by monitoring the outputs of buffers 48 of respective receivers.

Flip-flop 45 has its Reset input coupled to the Q output of flip-flop 53, which is connected in cascade with flip-flop 51 and is clocked therewith by a locally generated clock supplied over line 55. The frequency of the local clock on line 55 is a multiple of the data clock rate that is embedded within the monitored data burst and is also applied to the clock (count) input of counter 31. In the exemplary embodiment of the present invention illustrated in FIG. 2, counter 31 is a divide-by-sixty-four counter (or has a count capacity of 0-63 before rolling over). The six respective bit output lines of counter 31 are coupled to latch 33 and to an AND gate 57, the output of which is coupled to the 'D' input of flip-flop 51. AND gate 57 serves to detect when counter 31 has reached capacity, so that 'missed' data transitions can be accommodated. As will be explained below, in the event that counter 31 counts to capacity without a data transition having been detected (by a signal on link 25), then, through flip-flops 51 and 53, the change in state of the output of AND gate 57 is used to provide a direct reset to flip-flop 45 and cause multiplexer 35 to select the hardwired input code 33.

In addition to each of its output bit lines being coupled to AND gate 57, counter 31 has its most significant bit line 61 coupled to an invertor 63 from the output of which a regenerated clock signal RXCLK is derived. Namely, the inverse of the most significant bit output of counter 31 sources the regenerated clock signal RXCLK on output link 65. The regenerated clock signal RXCLK is also coupled to accumulator 41 and a long term average latch 67, which is coupled to receive the contents of the accumulator, for controlling the timing of the loading of their respective inputs. The regenerated clock is also coupled to a counter 71, which generates an output over links 73 and 75 to timing logic circuit 77 comprised of flip-flop 81 and an AND gate 83, the outputs of which are coupled via links 85 and 87, respectively, to latch 67 and accumultor 41. In response to counter 71 counting a prescribed number of regenerated clock signals RXCLK (sixteen in the present example), the logic state of lines 85 and 87 from timing logic circuit 77 change state to control the load-enabling of long term average latch 67 and the clearing of the contents of accumulator 41.

The six bit inputs to latch 67 are derived from shifted contents of accumulator 41 in order to effectively average the contents of the accumulator over a prescribed number of phase difference values (sixteen in the present example). Consequently, accumulator 41 is a ten bit device, with its outputs derived from the six most significant bit positions (namely, shifted by four bit to effect a divide-by-sixteen or averaging of the phase shift value total over sixteen regenerated clock times). The contents of latch 67 are coupled, together with the contents of counter 31, to comparator 91, the output of which on line 93 changes state in response to the phase difference value in counter 31 matching that stored in latch 67. In response to this change in state of link 93, the contents of counter 31 are cleared, which effectively aligns the regenerated clock signal on line 65 with the phase of the embedded clock signal within the monitored signal. In addition, upon the next local clock signal on line 30, a flip-flop 95 to the D input of which line 93 is also coupled, changes state, clearing the contents of latch 67.

OPERATION

As described briefly above, the timing signal recovery and alignment mechanism according to the present invention monitors the forty bit synchronization preamble 10 shown in FIG. 1 and rapidly acquires and tracks the frequency and phase of the embedded data clock signal prior to beginning of the block code sync word at time Tsw. (Prior to the beginning of the burst at time Tsb, the receiver is effectively unquieted, so that transitions on link 21 can be assumed to be randomly spaced. The system is always active, with a local clock on link 30 continuously incrementing counter 31.) Let it be assumed that the receiver has begun receiving a transmission burst, so that the alternating one and zero sequence of the sync preamble is being coupled over link 21 to transition detector 23. When detector 23 detects a transition in the sync preamble on link 21, it produces an output over link 25 which, in turn, clocks latch 43, causing the contents in counter 31 to be loaded into latch 43, the output of which is coupled through multiplexer 35 to timing latch 47 (which compensates for any asynchronous operation of the multiplexer). As counter 31 continues to count input clock signals on line 30, its most significant bit changes state upon the count changing from a count of 31 to 32 and upon rolling over (changing count from 63 to 0), which cause a change in state in the regenerated clock signal RXCLK derived over line 65 from invertor 63. The regenerated clock signal RXCLK on line 65 increments counter 71 and clocks each of latch 47 and accumulator 41. Consequently, the contents of accumulator 41 are updated by the (phase offset representative) count value stored in latch 47.

As successive transitions in the monitored sync preamble are detected the above process is repeated, so that phase difference values as defined by the latched contents of counter 31 are successively coupled to accumulator 41 to provide repeated measures of the (phase) difference between the times of occurrence of the regenerated clock signal RXCLK on line 65 and the actual times of occurrence of the sync preamble transitions. (As noted above, in the event that a transition is not detected prior to counter 31 rolling over, the output of AND gate 57 changes state, resetting flip-flop 45 and inverting the select bit input to multiplexer 35. In turn, multiplexer 35 couples a hardwired binary code value of "31" to latch 47 for application to accumulator 41. This value is chosen at mid-clock on the basis of an assumption of perfect timing for any missed or absent transition.

Eventually, the contents of counter 71, which continues to count regenerated clock signals RXCLK, reaches a count of sixteen, corresponding to the averaging interval of the present example. As a consequence, the outputs of timing logic circuit 77 on lines 85 and 87 change state, so as to enabling the loading of long term latch 67 with the averaged (over sixteen regenerated clock intervals) contents of accumulator 41 and the resetting of the accumulator in preparation for a new averaging sequence. The contents of latch 67 are coupled to comparator 91, which compares the phase difference average representative code stored in the latch as coupled from accumulator 41 with the contents of counter 31. As counter 31 continues to be successively incremented its contents will eventually match the phase difference average, causing the output of comparator on line 93 to change state. At the next local clock signal on line 30, the contents of long term average latch are cleared and counter 31 is reset, which has the effect of reducing or shifting the contents of counter 31 by the amount of the phase difference average, thereby aligning the phase of the regenerated clock signal RXCLK on line 65 with that of the monitored signal on line 21.

As will be appreciated from the foregoing description, the signal format and hardware complexities of conventional burst mode timing recovery mechanisms are obviated by a bit synchronization apparatus that is capable of analyzing a relatively brief synchronization preamble (on the order of forty bit times or less) using simplified digital logic components (e.g. programmable array logic) to rapidly acquire and track the frequency and phase of the embedded data clock signal. It is to be observed that the parameters given in the present description are for illustrative purposes only and are not to be considered limitative of the present invention. For example, while the choice of sixteen regenerated clock signals was chosen for the averaging interval because it is an integral multiple of two and thereby readily implemented using simplified digital logic, other values can be used as well as long as there is sufficient resolution provided by the interval chosen to achieve alignment of the regenerated clock. The values chosen were based upon accomplishing the alignment function within a priori sync preamble of forty bit times, while still permitting the use of a simplified logic configuration. (Although a thirty-two bit resolution would also facilitate a simplified logic implementation, the margin of error (eight bits) within the sync window would be virtually unacceptable.)

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. An apparatus for generating a timing signal in synchronism with transitions of an input signal comprising:
   first means coupled to receive clock signals and generating therefrom first signals at the frequency of said input signal;
   second means, coupled to receive said first signals and said input signal, for generating second signals representative of respective time differentials between transitions in said input signal and said first signals;
   third means, coupled to said first and second means, for measuring the average of a plurality of the time differential representative second signals for a prescribed number of said first signals and generating a third signal representative of said average; and
   fourth means, coupled to said first and third means, for adjusting the phase of said first signals in accordance with said third signal, the resultant phase-adjusted first signals forming said timing signal.

2. An apparatus according to claim 1, wherein said first means comprises a counter for counting said clock signals and generating a first signal in response to its count total reaching a prescribe value.

3. An apparatus according to claim 2, wherein said second means comprises means for generating a second signal as the count total of said counter in response to a transition in said input signal.

4. An apparatus according to claim 3, wherein said third means comprises means for storing the count totals represented by successive ones of said second signals and generating said third signal as the average of its stored count total.

5. An apparatus according to claim 4, wherein said second means comprises means for generating a second signal as a prescribed value in response to said counter counting a predetermined number of clock signals absent a transition in said input signal.

6. An apparatus according to claim 4, wherein said third means comprises means for generating said third signal as a first code representative of said average and wherein said fourth means comprises means for comparing said first code with the contents of said counter and controllably modifying the contents of said counter to a prescribed count value in response to said first code corresponding to the contents of said counter.

7. An apparatus according to claim 6, wherein said fourth means includes storage means for storing said first code for comparison with the contents of said counter and includes means for clearing the contents of said storage means in response to said first code corresponding to the contents of said counter.

8. An apparatus according to claim 7, wherein said third means includes means for counting said first signals and resetting its stored average value in response to counting said prescribed number of said first signals.

9. An apparatus according to claim 8, wherein said fourth means includes means for storing said first code in response to said third means counting said prescribed number of said first signals.

10. An apparatus according to claim 1, further including fifth means, coupled to said second means, for providing an interface through which the respective time differentials represented by said second signals may be externally accessed.

11. A method for generating a timing signal in synchronism 1 with transitions of an input signal comprising the steps of:
(a) generating first signals at the frequency of said input signal in accordance with a clock signal sequence;
(b) generating second signals representative of respective time differentials between transitions in said input signal and said first signals; differential representative second signals for a prescribed number of said first signals and generating a third signal representative of said average; and
(d) adjusting the phase of said first signals in accordance with said third signal, the resultant phase-adjusted first signals forming said timing signal.

12. A method according to claim 11, wherein step (a) comprises counting clock signals and generating a first signal in response to the count total reaching a prescribe value.

13. A method according to claim 12, wherein step (b) comprises generating a second signal as the count total in response to a transition in said input signal.

14. A method according to claim 13, wherein step (c) comprises storing the count totals represented by successive ones of second signals and generating said third signal as the average of the stored count total.

15. A method according to claim 14, wherein step (b) comprises generating a second signal as a prescribed value in response to counting a predetermined number of clock signals absent a transition in said input signal.

16. A method according to claim 14, wherein step (c) comprises generating said third signal as a first code representative of said average and wherein step (d) comprises comparing said first code with the count total and controllably modifying the count total to a prescribed count value in response to said first code corresponding to the count total.

17. A method according to claim 16, wherein step (d) comprises storing said first code for comparison with said count total and includes assigning, as said first code, a preselected code in response to said first code corresponding to said count total.

18. A method according to claim 17, wherein step (d) includes storing said first code in response to said count total reaching said prescribed number of said first signals.

19. A method according to claim 11, further including the step (e) of providing an interface through which the respective time differentials represented by said second signals may be externally accessed.

20. An apparatus for generating a timing signal in synchronism with transition of an input signal comprising:
first means coupled to receive clock signals and generating, therefrom first signals to the frequency of said input signal;
second means, coupled to receive said first signals and said input signal, for generating second signals representative of respective time differentials between transitions in said input signal and said first signals; and
third means, coupled to said first and second means, for adjusting the phase of said first signals in accordance with a plurality of the time differential representative second signals for a prescribed number of said first signals, the resultant phaseadjusted first signals forming said timing signal.

21. An apparatus according to claim 20, wherein said first means comprises a counter for counting said clock signals and generating a first signal in response to its count total reaching a prescribed value.

22. An apparatus according to claim 21, wherein said second means comprises means for generating a second signal as the count total of said counter in response to a transition in said input signal.

23. An apparatus according to claim 22, wherein said third means comprises means for storing the count totals represented by successive ones of said second signals and generating a third signal as the average of its stored count total.

24. An apparatus according to claim 23, wherein said second means comprises means for generating a second signal as a prescribed value in response to said counter counting a predetermined number of clock signals absent a transition in said input signal.

25. An apparatus according to claim 23, wherein said third means comprises means for generating said third signal as a first code representative of said average and including means for comparing said first code with the contents of said counter and controllably modifying the contents of said counter to a prescribed count value in response to said first code corresponding to the contents of said counter.

26. An apparatus according to claim 25, wherein said third means further includes storage means for storing said first code for comparison with the contents of said counter and includes means for clearing the contents of said storage means in response to said first code corresponding to the contents of said counter.

27. An apparatus according to claim 26, wherein said third means includes means for counting said first signals and resetting its stored average value in response to counting said prescribed number of said first signals.

28. An apparatus according to claim 27, wherein said third means includes means for storing said first code in response to said counting means counting said prescribed number of said first signals.

29. An apparatus according to claim 20, further including fourth means, coupled to said second means, for providing an interface through which the respective time differentials represented by said second signals may be externally accessed.

* * * * *